United States Patent
Klein

[11] Patent Number: 5,887,930
[45] Date of Patent: Mar. 30, 1999

[54] DEVICE FOR DAMPING THE MOVEMENT OF A MOVABLY SUPPORTED STRUCTURAL PART, IN PARTICULAR OF A FLAP IN AN AUTOMOTIVE VEHICLE OF THE LIKE

[75] Inventor: Roland Klein, Ammersbek, Germany

[73] Assignee: ITW-ATECO GmbH, Norderstedt, Germany

[21] Appl. No.: 746,954

[22] Filed: Nov. 18, 1996

[30] Foreign Application Priority Data

Nov. 16, 1995 [DE] Germany .......................... 295 18 173.7

[51] Int. Cl.⁶ ...................................................... B60N 3/12
[52] U.S. Cl. ...................................... 296/37.12; 296/37.9
[58] Field of Search ................................ 296/37.7, 37.1, 296/37.8, 37.9, 37.12, 37.13; 16/82, 348, 354, 325, 357, 361, 360; 49/336, 334, 341, 350; 312/315.1, 315.2

[56] References Cited

U.S. PATENT DOCUMENTS

| 4,368,937 | 1/1983 | Palombo et al. ................... 296/37.7 |
| 4,426,752 | 1/1984 | Nakayama ................................. 16/82 |
| 4,893,522 | 1/1990 | Arakawa ................................. 74/574 |
| 5,090,521 | 2/1992 | Miura ..................................... 188/82.1 |
| 5,269,397 | 12/1993 | Kawamoto et al. ..................... 188/290 |
| 5,275,456 | 1/1994 | Ishii et al. .............................. 296/37.12 |
| 5,413,317 | 5/1995 | Spoerre ................................... 296/37.8 |
| 5,625,533 | 4/1997 | Kim et al. ............................... 361/681 |

FOREIGN PATENT DOCUMENTS

| OE 224 496 | 11/1962 | Austria . |
| 33 20069 | 12/1983 | Germany . |
| 37 22 114 | 1/1988 | Germany . |

Primary Examiner—D. Glenn Dayoan
Assistant Examiner—Kiran Patel
Attorney, Agent, or Firm—Schwartz & Weinrieb

[57] ABSTRACT

A device for damping the movement of a movably supported structural part, in particular of a flap or the like in an automotive vehicle, where a tooth segment is located on the structural part, the tooth segment co-operating with a pinion which is associated with a rotary damping element and stationarily located relative to the structural part, whereby the rotary damping element is attached to a pivotally supported arm, in that the rotary damping element or the arm, respectively, has an extension, a guide portion being provided at the free end of the arm which co-operates with a guide path on the structural part such that the distance between the pinion and the tooth segment remains approximately constant.

20 Claims, 2 Drawing Sheets

DEVICE FOR DAMPING THE MOVEMENT OF A MOVABLY SUPPORTED STRUCTURAL PART, IN PARTICULAR OF A FLAP IN AN AUTOMOTIVE VEHICLE OF THE LIKE

FIELD OF THE INVENTION

The present invention relates to a device for damping the movement of a movably supported structural part, in particular of a flap in an automotive vehicle or the like.

BACKGROUND OF THE INVENTION

It is known for movable or pivotally supported structural parts in automotive vehicles, such as, for example, glove compartment covers, lids for ash-trays, holding grips or the like to exert a bias thereon by means of a spring and/or gravity. In connection with a cover for a glove compartment such a part is biased by a spring towards the open position. When actuated in the closed position it is only necessary to release the locking mechanism so that the cover opens automatically. In the case of a holding grip such a part is automatically biased towards its rest position. It is also known to dampen the movement of such structural parts by suitable damping means in order to moderate the effect of the spring means. Thus, undesired acoustic effects and wear are avoided. In many cases so-called rotary dampers are used. Rotary dampers usually include a rotor rotatably supported in a housing. A pinion is mounted upon the shaft of the rotor which meshes with a tooth segment. If a flap, cover or lid or the like is moved, the rotor is contemporarily rotated. A gap is formed between the rotor and the housing filled with a viscous medium adapted to perform a rotary dampening operation. A typical rotary damper is disclosed in the German patent publication DE 33 20 069.

Conventional rotary dampers have a damping effect in both rotational directions. In many cases this is not desired. If for example a cover for a glove compartment is biased to its opened position by a spring or by gravity, this force has to be overcome if the cover is closed manually. Also the damping effect of the rotary damper has to be overcome which may require a relatively high force.

Therefore, it has also become known to provide the rotary dampers with a free wheel mechanism. Such rotary dampers have a damping effect only in one rotational direction, whereas in the opposite direction the resistance against rotation is relatively small. Such a rotary damper is known from the German patent publication DE 37 22 114. Between the rotor and a shaft a ratchet clutch is connected such that a locking takes place only in one rotational direction. The coupling parts are biased by a spring towards each other. From the Austrian patent publication OE 224 496 it is known to provide a rotary damper for the hinge of a door, with the damper including a clutch spring which coacts with the walls of bores of the parts to be coupled. A disengagement of the coupling parts is achieved when the spring is wound up.

Rotary dampers which include a pinion and a tooth segment may develop noise. Above all, if the space between the pinion and segment changes, noise may not be avoided. Conventional arrangements of the kind described, however, cannot avoid tolerances.

OBJECT OF THE INVENTION

It is an object of the present invention to provide a device for dampening the movement of a movably supported structural part, in particular of a flap or the like in an automotive vehicle, wherein the co-operation between the damper element and a tooth segment is as noiseless as possible.

SUMMARY OF THE INVENTION

The invention includes two alternative solutions. In both solutions a rotary damper element is attached to a pivotally supported arm. According to the first alternative solution the arm has a guide portion which co-operates with a guide path on the structural part. The co-operation of the guide portion and the guide path results in a constant distance being maintained between the pinion and the tooth segment.

In the second alternative solution the arm is subjected to a force of a spring which biases the pinion into permanent contact with the tooth segment. Also in this manner the space between the pinion and the tooth segment is constant. In both cases a smooth actuation of the rotary damper is achieved upon movement of the structural part.

According to an embodiment of the present invention, the damping effect is only achieved in one rotational direction. In a preferred embodiment of the present invention the rotor has a shaft, and a coil spring having at least one winding is wound onto the shaft, with one end of the spring being attached to a follower shaft for the pinion. In one rotational direction, the coil spring is thus contracted and coacts with a portion of the shaft so that the shaft is driven jointly with the spring. In the other rotational direction the spring moves loosely on the shaft portion so that a free wheel mechanism is established.

BRIEF DESCRIPTION OF THE DRAWINGS

Various other objects, features, and attendant advantages of the present invention will fully appreciated by means of embodiment example is subsequently described in connection with the accompanying drawings, in which like reference numberals designate like or corresponding parts thereof throughout the several views, and wherein.

DETAILED DESCRIPTION OF THE PREFERRED EMBODIMENT

Figure 1:
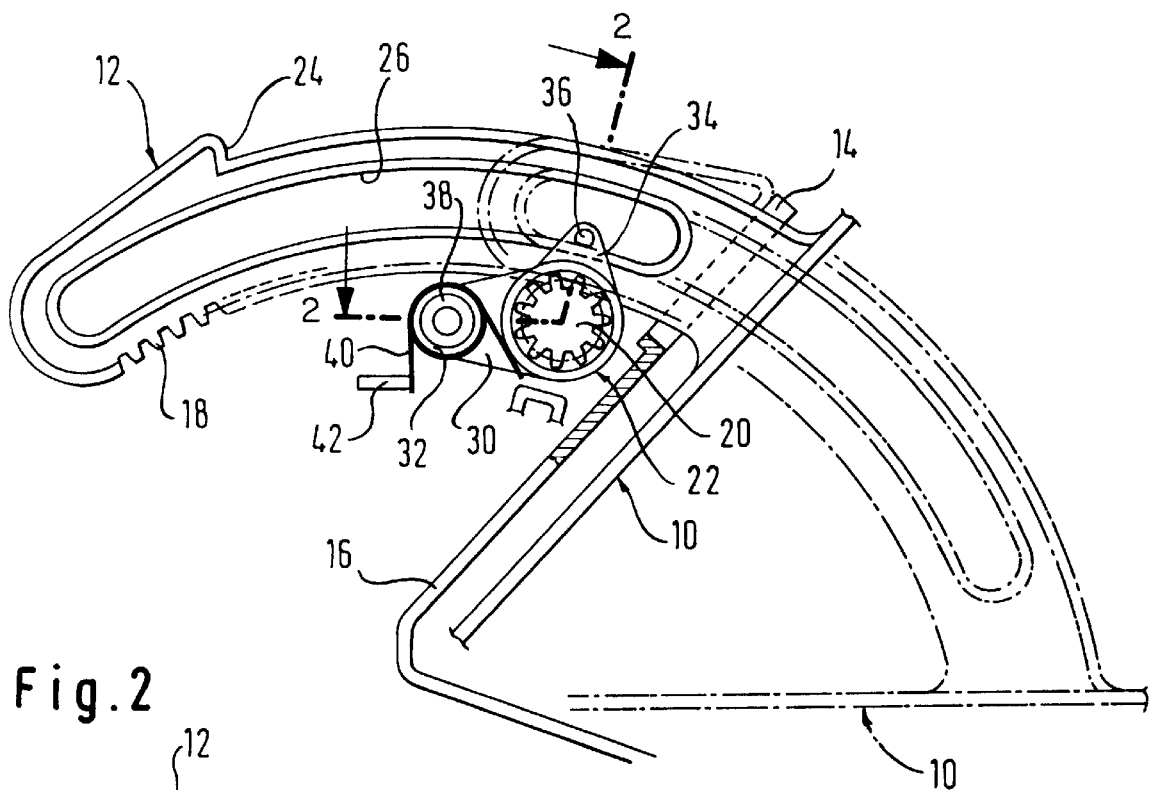
FIG. 1 is a plan view of a damping device according to the present invention.

In FIG. 1 a flap, a cover, a lid or the like is indicated by the reference number 10. The flap 10 is pivotally supported between a position shown with continuous lines and another position shown with dash-dotted lines. An arcuate arm 12 is attached to the inner surface of flap 10, the arm 12 extending through a recess or an opening 14 of a stationary structure which is formed by a wall portion 16. The flap 10 for example is the cover of a glove compartment in an automotive vehicle. At the lower side the arm 12 has a tooth segment 18 which co-operates with a pinion 20 of a rotary damper 22. The arm 12 has a stop 24 on the opposite side which coacts with wall portion 16 and thus limits the opening movement of flap 10. An arcuate slot 26 is formed in the arm 12.

Figure 2:
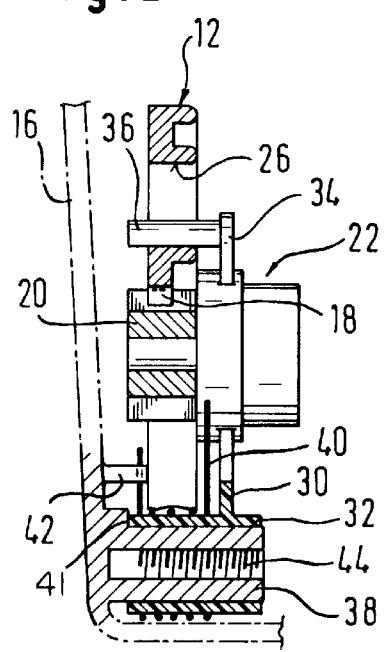
FIG. 2 is a cross-sectional view through the device of FIG. 1 taken along line 2—2.
Figure 3:
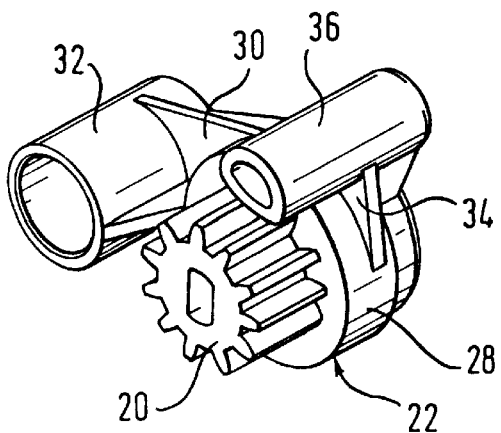
FIG. 3 is a perspective view of a rotary damper used in connection with the device of FIGS. 1 and 2.

The arrangement of the rotary damper 22 can be seen in FIGS. 2 and 3. In FIG. 3 it can be seen that the housing 28 of the rotary damper 22 is formed integrally with an arm 30. A bushing 32 is integrally formed with arm 30. An extension 34 disposed at an angle relative to arm 30 is formed upon the housing 28, and a sleeve-like guide portion 36 is formed upon extension 34.

The guide portion 36 has a flattened portion on the surface facing the pinion 20, with the flattened portion co-operating with the lower wall of slot 26. The bushing 32 is rotatably supported on a support projection or pin 38 which is circular in cross section. Thus, arm 30 and also rotary damper 22 are rotatably supported. The rotatable support of the rotary damper 22 and of the pinion 20 has the effect that due to the engagement of the guide portion 36 with the lower wall of slot 26, the pinion 20 is maintained at a constant distance from the tooth segment 18 independent of the rotational position and the tolerances of flap 10.

In FIGS. 1 and 2 a coil spring 40 is shown located on the bushing 32, one end of the spring engaging a stationary abutment 42 whereas the other end engages the housing 28 of rotary damper 22. By means of spring 40 a bias is generated toward the tooth segment 18 of arm 12. It is understood that spring 40 or guide portion 36, respectively, can be used cojointly or optionally to obtain the same result, that is, the constant engagement of pinion 20 with tooth segment 18.

To hold the bushing 32 in place axially a shoulder 41 on the support pin 38 is provided, and a screw not shown is threaded into a bore 44 of pin 38, the head of the screw forming an axial limit for bushing 32.

Figure 4:
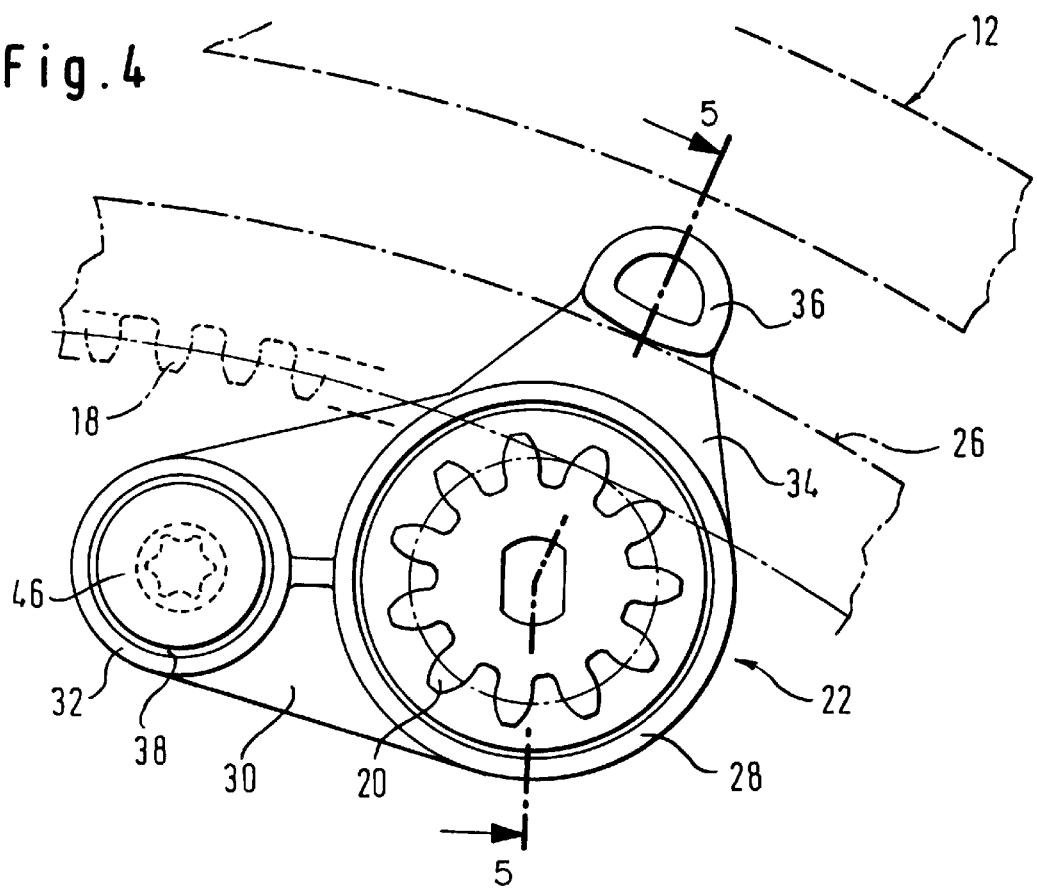
FIG. 4 is a side view of the rotary damper of FIG. 3.

In FIG. 4 the rotary damper 22 according to FIGS. 1 to 3 is illustrated on a larger scale. From this illustration the pivotal support of lever arm 30 and the guidance of the guide portion 36 at the lower wall of slot 26 can be easily seen. In FIG. 4 there is also shown the head of a screw 46, with the shaft thereof being threaded into the bore 44 of support pin 38.

Figure 5:
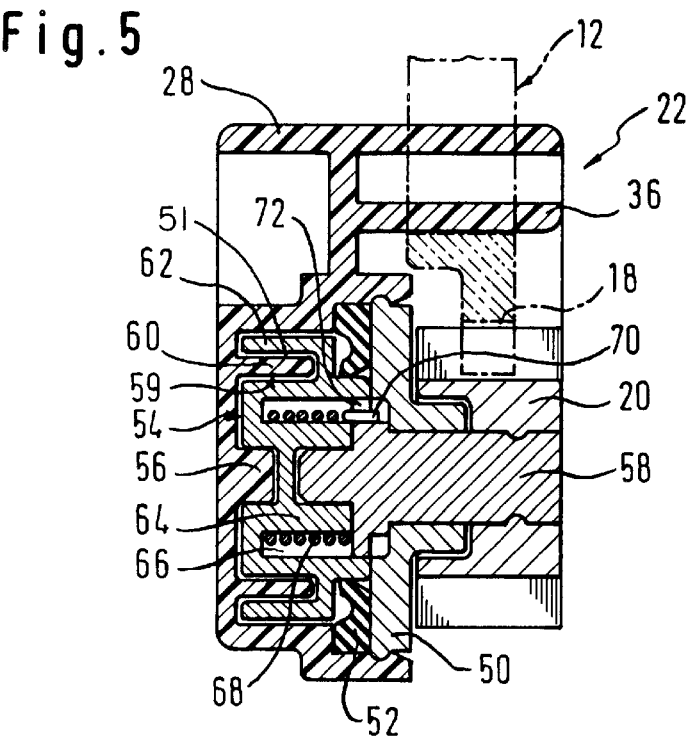
FIG. 5 is a cross-sectional view through the damper of FIG. 4 taken along line 5—5.

The structure of the rotary damper 22 can be seen more clearly in FIG. 5. FIG. 5 illustrates that the housing 28 has a cavity which is covered by a lid 50. An annular sealing ring 52 is located between lid 50 and a shoulder of the wall of the cavity. A rotor 54 is located in the cavity with one side thereof being rotatably supported by a support pin 56 secured to the housing 28. On the other side the rotor 54 is supported by a support pin 58 which is fixedly located on the pinion 20. The rotor 54 has an annular recess 51 on the side facing the bearing pin 56, and an annular flange 60 of the housing 28 extends into the recess 51. The shape of the rotor 54, the recess 51 and the flange 60, respectively, is such that radial and axial gaps are formed into which a viscous medium is supplied. The viscous medium generates a braking effect if the rotor 54 is rotated. At the free end of flange 60 and upon the annular portion 62 of rotor 54 axial cuts are provided (not shown). They allow all gaps to be completely filled with the braking fluid. Furthermore, they serve as a restricted reservoir for the fluid.

The sealing ring 52 coacts with the rotor 54 in order to prevent leakage of the fluid through the cover or lid 50. The lid 50 forms a bearing for support or bearing pin 58.

An inner shaft portion 64 of the rotor 54 forms an annular space 66 which accommodates a coil spring 68, one end 70 thereof coacting with a recess 72 in the pin 58. The size of the coil spring 68 is radially reduced in one rotational direction of the pin 58 so that a frictional engagement with the shaft portion 64 occurs. In this case rotor 54 is moved jointly with the rotation of pin 58. In the opposite rotational direction the coil spring 58 slides loosely on the shaft portion 64 so that a free wheeling operation is achieved.

Obviously, many modifications and variations of the present invention are possible in light of the above teachings. It is therefore to be understood that within the scope of the appended claims, the present invention may be practiced otherwise than as specifically described herein.

I claim:

1. A device for damping the movement of a movably supported structural part, comprising:

a toothed segment disposed upon said structural part; and a rotary damping element comprising a housing, a toothed pinion mounted upon said housing for rotatable engagement with said toothed segment of said structural part as said structural part is moved, and a means extending from said housing of said rotary damping element and engaged with said structural part for maintaining said toothed pinion of said rotary damping element rotatably engaged with said toothed segment of said structural part as said structural part is moved.

2. The device as set forth in claim 1, wherein:

said structural part has an arcuate slot portion defined therein; and said means mounted upon said rotary damping element comprises a guide portion disposed within said arcuate slot of said structural part such that toothed segment of said structural part is effectively trapped between said guide portion and said toothed pinion of said rotary damping element.

3. The device as set forth in claim 1, wherein:

said structural part comprises an automotive vehicle glove compartment cover.

4. The device as set forth in claim 1, wherein:

said rotary damping element comprises a one-way rotary damping element.

5. The device as set forth in claim 3, wherein:

stop means is disposed upon said structural part for engaging a frame portion of an automotive vehicle glove compartment assembly so as to limit the degree to which said automotive vehicle glove compartment cover is permitted to be opened.

6. The device as set forth in claim 1, wherein:

said rotary damping element is pivotally mounted at a position adjacent to said structural part; and spring means are provided for pivotally biasing said rotary damping element such that said toothed pinion is biased into engagement with said toothed segment of said structural part.

7. The device as set forth in claim 4, wherein:

said one-way rotary damping element comprises said housing, a damping fluid disposed within said housing, a rotor immersed within said damping fluid, and a coil spring disposed about said rotor and having one end thereof operatively connected to said toothed pinion such that when said toothed pinion is rotated in a first direction, the diametrical extent of said coil spring will be reduced so as to cause said rotor to rotate within said damping fluid, whereas when said toothed pinion is rotated in a second opposite direction, the diametrical extent of said coil spring is not reduced so as to permit said toothed pinion to rotate without inducing corresponding rotation of said rotor.

8. A device for damping the movement of a movably supported structural part, comprising:

a toothed segment disposed upon said structural part;

a rotary damping element having a toothed pinion mounted thereon for rotatable engagement with said toothed segment of said structural part as said structural part is moved;

means for pivotally mounting said rotary damping element at a position adjacent to said structural part; and spring means operatively engaged with said rotary damping element for pivotally biasing said rotary damping element toward said structural part such that said toothed pinion of said rotary damping element is maintained rotatably engaged with said toothed segment of said structural part as said structural part is moved.

9. The device as set forth in claim 8, wherein:

said means for pivotally mounting said rotary damping element at a position adjacent to said structural part comprises a bushing; and said spring biasing means comprises a coil spring mounted upon said bushing.

10. The device as set forth in claim 8, further comprising:

arcuate slot means defined within said structural part; and guide means mounted upon said rotary damping element and disposed within said slot means of said structural part such that said toothed segment of said structural part is effectively trapped between said guide means and said toothed pinion of said rotary damping element.

11. The device as set forth in claim 10, wherein:

said structural part comprises an automotive vehicle glove compartment cover;

said arcuate slot means is defined within an arcuately shaped arm portion integral with said glove compartment cover; and stop means are provided upon said arm portion of said glove compartment cover for engaging a frame portion of an automotive vehicle glove compartment assembly so as to limit the degree to which said glove compartment cover is permitted to be opened.

12. The device as set forth in claim 8, wherein:

said rotary damping element comprises a one-way rotary damping element.

13. The device as set forth in claim 12, wherein said one-way rotary damping element comprises:

a housing;

a damping fluid disposed within said housing;

a rotor disposed within said housing and immersed within said damping fluid; and a coil spring disposed about said rotor and having one end thereof operatively connected to said toothed pinion such that when said toothed pinion is rotated in a first direction, the diametrical extent of said coil spring will be reduced so as to operatively connect said rotor with said toothed pinion whereby rotation of said toothed pinion will be damped as a result of damped rotation of said rotor within said damping fluid, whereas when said toothed pinion is rotated in a second opposite direction, the diametrical extent of said coil spring is not reduced so as to permit said toothed pinion to rotate without inducing corresponding damped rotation of said rotor.

14. A device for damping the movement of a movably supported structural part, comprising:

a structural part having a toothed segment disposed upon said structural part and an arcuate slot defined within said structural part;

a rotary damping element comprising a housing, a toothed pinion mounted upon said housing for rotatable engagement with said toothed segment of said structural part as said structural part is moved, and a guide means mounted upon and extending from said housing of said rotary damping element so as to be disposed within said arcuate slot of said structural part such that said toothed segment of said structural part is effectively trapped between said guide means and said toothed pinion of said rotary damping element whereby said toothed pinion of said rotary damping element is maintained rotatably engaged with said toothed segment of said structural part as said structural part is moved.

15. The device as set forth in claim 9, wherein:

said structural part comprises an automotive vehicle glove compartment cover.

16. The device as set forth in claim 14, further comprising:

means for pivotally mounting said rotary damping element at a position adjacent to said structural part; and spring biasing means for pivotally biasing said rotary damping element into engagement with said toothed segment of said structural part.

17. The device as set forth in claim 14, wherein:

said structural part comprises an automotive vehicle glove compartment cover;

said arcuate slot is defined within an arcuately shaped arm portion integral with said glove compartment cover; and stop means are provided upon said arm portion of said glove compartment cover for engaging a frame portion of an automotive vehicle glove compartment assembly so as to limit the degree to which said glove compartment cover is permitted to be opened.

18. The device as set forth in claim 14, wherein:

said rotary damping element comprises a one-way rotary damping element.

19. The device as set forth in claim 18, wherein said one-way rotary damping element comprises:

a housing;

a damping fluid disposed within said housing;

a rotor disposed within said housing and immersed within said damping fluid; and a coil spring disposed about said rotor and having one end thereof operatively connected to said toothed pinion such that when said toothed pinion is rotated in a first direction, the diametrical extent of said coil spring will be reduced so as to operatively connect said rotor with said toothed pinion whereby rotation of said toothed pinion will be damped as a result of damped rotation of said rotor within said damping fluid, whereas when said toothed pinion is rotated in a second opposite direction, the diametrical extent of said coil spring is not reduced so as to permit said toothed pinion to rotate in an undamped manner as a result of said toothed pinion remaining operatively disconnected from said rotor.

20. The device as set forth in claim 6, wherein:

said means for pivotally mounting said rotary damping element comprises a bushing; and said spring biasing means comprises a coil spring mounted upon said bushing.

* * * * *